United States Patent [19]

Nakanowatari et al.

[11] Patent Number: 4,810,061
[45] Date of Patent: Mar. 7, 1989

[54] LIQUID CRYSTAL ELEMENT HAVING CONDUCTIVE WIRING PART EXTENDING FROM TOP OF TRANSISTOR LIGHT SHIELD TO EDGE

[75] Inventors: Jun Nakanowatari, Miyagi; Kazuya Okabe, Ibaragi; Hideyuki Matsuda, Iwaki, all of Japan

[73] Assignee: Alps Electric Co., Ltd., Japan

[21] Appl. No.: 173,301

[22] Filed: Mar. 25, 1988

[30] Foreign Application Priority Data

Jun. 24, 1987 [JP] Japan ............................ 62-156931

[51] Int. Cl.⁴ .............................................. G02F 1/13
[52] U.S. Cl. ................................. 350/334; 350/336; 350/338; 350/344; 350/350 S
[58] Field of Search ............... 350/333, 334, 336, 338, 350/344, 350 S

[56] References Cited

U.S. PATENT DOCUMENTS

| | | | |
|---|---|---|---|
| 4,448,491 | 5/1984 | Okubo | 350/344 |
| 4,536,059 | 8/1985 | Van den Berk | 350/344 X |
| 4,653,864 | 3/1987 | Baron et al. | 350/344 |
| 4,697,331 | 10/1987 | Boulitrop et al. | 350/336 X |
| 4,723,838 | 2/1988 | Aoki et al. | 350/334 X |
| 4,733,948 | 3/1988 | Kitahara | 350/334 X |
| 4,759,610 | 7/1988 | Yanagisawa | 350/334 |

FOREIGN PATENT DOCUMENTS 61-183625A  8/1986  Japan.
61-208029A  9/1986  Japan.

*Primary Examiner*—Stanley D. Miller
*Assistant Examiner*—Richard Gallivan
*Attorney, Agent, or Firm*—Guy W. Shoup; Paul J. Winters

[57] ABSTRACT

Disclosed is a liquid crystal element using a film transistor as a switching element, the liquid crystal element comprising two substrates opposed to each other, film transistors and spacers disposed on the opposed surface of one of the substrates, a transparent electrode formed on the opposed surface of the other substrate, a metal wiring formed simultaneously with a light shield of a film transistor or an upper metal layer of the spacer, the metal wiring having one end disposed between the film transistor or spacer and the transparent electrode whereas the other end thereof extends to the peripheral edge of the one substrate.

4 Claims, 3 Drawing Sheets

LIQUID CRYSTAL ELEMENT HAVING CONDUCTIVE WIRING PART EXTENDING FROM TOP OF TRANSISTOR LIGHT SHIELD TO EDGE

BACKGROUND OF THE INVENTION

1. Field of the Invention

This invention relates to a liquid crystal element using a film transistor as a switching element.

2. Description of the Prior Art

The liquid crystal element of the type as described heretofore known has a construction as shown in FIGS. 4 and 5. A liquid crystal element is indicated generally at 1. In this liquid crystal element 1, a liquid crystal 4 is poured into a gap formed between a lower substrate 2 and an upper substrate 3 opposed to each other, the liquid crystal 4 being sealed in a liquid-tight manner by a sealer 5 disposed in the peripheral edges of the substrates 2 and 3.

The lower substrate 2 is formed slightly larger than the upper substrate 3. On the opposed surface (upper surface in the figure) of the lower substrate 2 is provided a film transistor (hereinafter referred to as TFT) as a switching element internally of a portion surrounded by the sealer 5, and a picture element electrode 7 formed of such as ITO in the form of a film is formed adjacent to the TFT 6. The lower substrate 2 is provided with a spacer (not shown) for maintaining constant a cell gap between the lower substrate 2 and the upper substrate 3.

On the other hand, on the opposed surface (lower surface in the figure) of the upper substrate 3 is formed a transparent electrode 8 formed of ITO or the like in the form of a film internally of a portion surrounded by the sealer 5.

In the liquid crystal element 1 constructed as described above, in the past, a conductive path adapted to provide electric communication between the transparent electrode 8 and outside the element is formed from a silver paste. To form the conductive path, a web-like metal film 9 formed of chrome or the like is first formed on the upper surface of the lower substrate by film forming methods such as spatter method, metal vaporization method and the like. In this case, the metal film 9 is formed from the peripheral edge of the lower substrate 2 to the inner part of the lower substrate 2. On end 9a of the peripheral edge of the lower substrate 2 is formed as a terminal for removing an external portion of the transparent electrode 8, whereas the other end 9b thereof is formed so as to be extended toward the inside of a portion surrounded by the sealer 5. Then, the silver paste is coated on the other end 9b of the metal film 9 to form a conductive portion 10. Next, the upper substrate 3 is superposed to the lower substrate 2 to bring the conductive portion into contact with the edge of the transparent electrode 8 of the upper substrate 3, after which a gap between the lower substrate 2 and the upper substrate 3 is closed by the sealer 5 to provide a cell construction.

In the liquid crystal element 1 as described above, the transparent electrode 8, the conductive portion 10 and the metal film 9 are electrically connected, and the metal film 9 and the conductive portion 10 constitute a conductive path of the transparent electrode 8.

However, in the liquid crystal element 1 as described above, there are required many steps of preparing the conductive path of the transparent electrode 8, posing a problem which requires much labor for the manufacture.

SUMMARY OF THE INVENTION

According to the present invention, there is provided an arrangement wherein among two opposed substrates, a TFT and a spacer are provided on the opposed surface of one substrate, and one end of a metal wiring formed simultaneously with a light shield or an upper metal layer of the spacer is disposed between the TFT or spacer and a transparent electrode formed on the opposed surface of the other substrate, the other end of the metal wiring being extended to the peripheral edge of said one substrate.

In such a liquid crystal element as described above, the metal wiring serving as a conductive path for the transparent electrode can be formed simultaneously with the light shield of the TFT or the upper metal layer of the spacer, and therefore the number of steps for the manufacture can be decreased.

BRIEF DESCRIPTION OF THE DRAWINGS

FIGS. 1 to 3 show one example of a liquid crystal element according to this invention, in which FIG. 1 is a schematic sectional view of essential parts, FIG. 2 is a schematic plan view, and FIG. 3 is a schematic plan view showing a part of FIG. 2 on enlarged scale; and FIGS. 4 and 5 show one example of a conventional liquid crystal element, in which FIG. 4 is a schematic sectional view, and FIG. 5 is a schematic plan view.

DESCRIPTION OF THE PREFERRED EMBODIMENTS

Figure 1:
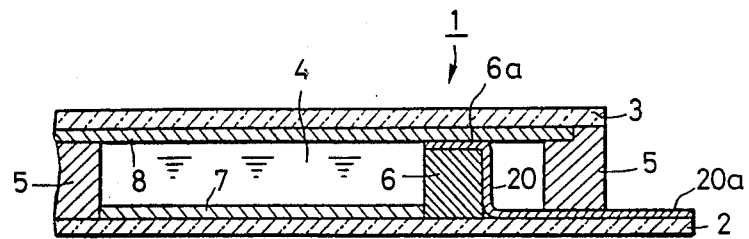
Figure 2:
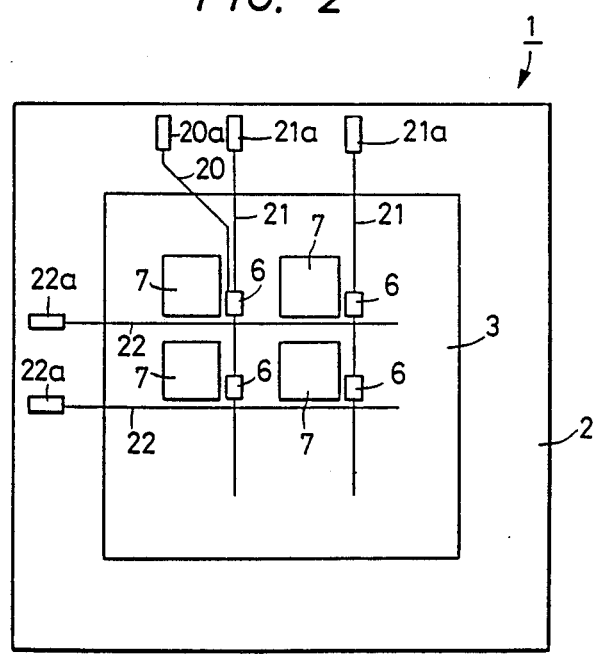
Figure 3:
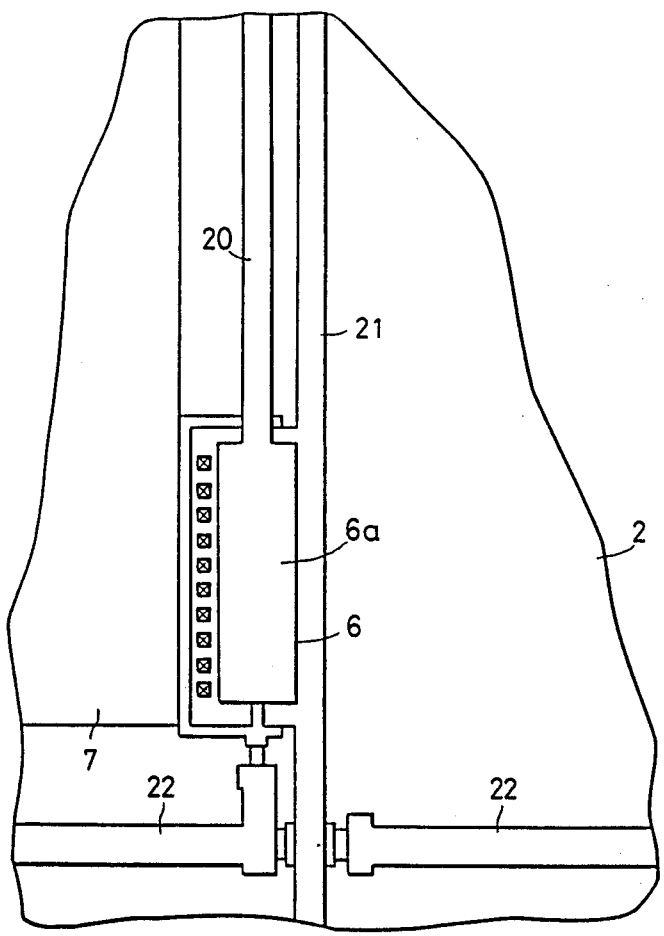
Figure 4:
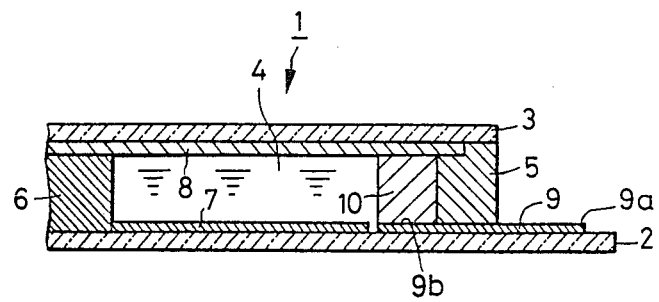
Figure 5:
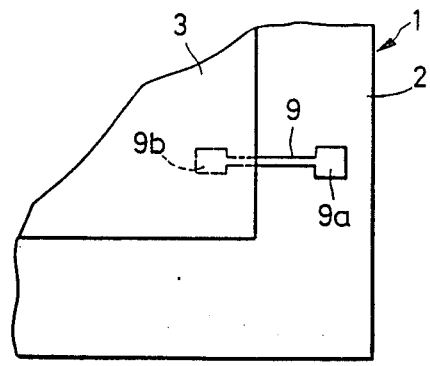

Referring now to FIGS. 1 to 3, the present invention will be described in detail.

Parts of the liquid crystal element of this invention common to those of the conventional liquid crystal element are indicated at like numerals, the description of which will not be made.

The liquid crystal element 1 shown in this embodiment is characterized in that as a conductive path for the transparent electrode 8, there is used a metal wiring 20 formed simultaneously with a light shield 6a of TFT 6.

As shown in FIG. 1, the metal wiring 20 has one end formed integral with the light shield 6a of TFT 6, from which it extends down the side wall of TFT 6, and the other end 20a extends to the peripheral edge of the lower substrate 2. The metal wiring 20 has its plane shape in the form of approximately linear of a strip of paper, and the other end 20a thereof is formed into a shape, for example, a rectangle whose ground area is large for a terminal for removing an outer portion. Material used to form the metal wiring 20 is the same material as the light shield 6a of TFT 6 and selected from those which are excellent in adhesive and conductive properties relative to the lower substrate 2 formed of glass or the like. Suitable material is metal such as aluminum.

This metal wiring 20 is produced simultaneously with the step of forming the light shield 6a on TFT 6. More specifically, a mask for the light shield 6a is applied onto the upper portion of the TFT 6, and then a mask for the metal wiring 20 having an opening continuous to an opening of the mask for the light shield 6a is applied onto the side wall portion of TFT 6 and the upper surface of the lower substrate 2, and thereafter the film forming method such as spatter method, metal vaporization method and the like is applied thereto. One end of the thus manufactured metal wiring 20 is formed integral with the light shield 6a of TFT 6, and an intermediate portion thereof is disposed in a space of the lower substrate 2 in which a number of source buses 21 ... and a number of gate buses 22 ... are provided in a lattice-like fashion. The other end 20a of the metal wiring 20 extends to the peripheral edge of the lower substrate 2 similarly to the terminal 21a of the source bus 21 and the terminal 22a of the gate bus 22.

Subsequently, one end of the metal wiring 20 integral with the light shield 6a of TFT 6 with the upper substrate 3 superposed to the upper side of the lower substrate 2 is brought into contact with the transparent electrode 8. Next, the liquid crystal 4 is poured into the gap between the lower substrate 2 and the upper substrate 3, after which the gap is sealed by the sealer 5 to provide a cell construction.

In the liquid crystal element 1 constructed as described above, the metal wiring 20 formed simultaneously with the light sheild 6a of TFT 6 is used as the conductive path of the transparent electrode 8, and therefore the number of manufacturing steps can be decreased to facilitate the manufacture and reduce the cost of manufacture.

In addition, the liquid crystal element 1 which uses a ferroelectric liquid crystal having a chiral/smectic C phase is used as the liquid crystal 4, the ferroelectric liquid crystal possesses a bistable state and a memory property of display and also high speed responsiveness. Therefore, the present liquid crystal element can be suitably used as a large capacity display, a memory-type display, and a high speed light shutter.

While in the above-described embodiment, the metal wiring 20 has been formed simultaneously with the light shield 6a of TFT 6, it is to be noted that the metal wiring can be formed simultaneously with an upper metal layer of a spacer (not shown) for maintaining constant a cell gap between the lower substrate 2 and the upper substrate 3. This spacer can be formed by stacking a conductive layer, a semiconductor layer, an insulating layer and the like substantially similar to TFT 6. Also, for the simultaneous formation of the upper metal layer of the spacer and the metal wiring 20 as the conductive path, there can obtain the effect of decreasing the number of manufacturing steps.

As described above, in the liquid crystal element according to the present invention, since the metal wiring serving as a conductive path for the transparent electrode is formed simultaneously with the light shield of TFT and the upper metal layer of the spacer, the number of manufacturing steps can be reduced, and therefore the manufacture is easy and the cost therefor can be reduced, thus providing an inexpensive element.

What is claimed is:

1. A liquid crystal element comprising two substrates opposed to each other, film transistors and spacers disposed on the opposed surface of one of said substrates, a transparent electrode formed on the opposed surface of the other substrate, a metal wiring formed simultaneously with a light shield of a film transistor or an upper metal layer of the spacer, said metal wiring having one end disposed between said film transistor or spacer and said transparent electrode whereas the other end thereof extends to the peripheral edge of said one substrate.

2. A liquid crystal element according to claim 1 wherein said metal wiring is formed of aluminum.

3. A liquid crystal element according to claim 1 wherein said metal wiring is in the shape of a linearity.

4. A liquid crystal element according to claim 1 wherein said metal wiring is in the shape of a strip of paper.

* * * * *